United States Patent

Shema et al.

[15] 3,639,293
[45] Feb. 1, 1972

[54] SLIME CONTROL METHOD AND COMPOSITION OF BETABROMO-BETANITROSTYRENE AND BIS-(TRICHLOROMETHYL)-SULFONE

[72] Inventors: Bernard F. Shema, Glenside; Robert H. Brink, Jr., Doylestown; Paul Swered, Philadelphia, all of Pa.

[73] Assignee: Betz Laboratories, Inc., Trevose, Pa.

[22] Filed: Jan. 2, 1970

[21] Appl. No.: 435

[52] U.S. Cl. .................................252/180, 21/58, 71/67, 210/64, 252/106
[51] Int. Cl. .........................................................C02b 1/18
[58] Field of Search..................252/180, 175, 106, 107, 117; 21/58; 424/349; 162/161, 190; 71/67; 210/62, 64

[56] References Cited

UNITED STATES PATENTS

| | | | |
|---|---|---|---|
| 3,231,509 | 1/1966 | Shema | 21/58 |
| 2,335,384 | 11/1943 | Bousquet | 424/349 X |
| 2,959,517 | 11/1960 | Bowens | 252/106 X |
| 3,342,671 | 9/1967 | Sousa | 424/349 |

*Primary Examiner*—John T. Goolkasian
*Assistant Examiner*—M. E. McCamish
*Attorney*—William J. Holcomb and Alexander D. Ricci

[57] ABSTRACT

The present invention relates to certain processes and compositions useful for inhibiting the growth of slime in water employed for industrial purposes, particularly water employed in the manufacture of pulp paper, water employed in cooling water systems, as well as other industrial waters. The novel processes and compositions of the present invention are processes or mixtures which show unexpected synergistic activity against micro-organisms, including bacteria, fungi and algae, which produce slime in aqueous systems and bodies which are objectionable from an operational or aesthetic point of view. Specifically, the invention is directed to compositions comprising a mixture of bis-(trichloromethyl)-sulfone and bromonitrostyrene and their use.

12 Claims, No Drawings

SLIME CONTROL METHOD AND COMPOSITION OF BETABROMO-BETANITROSTYRENE AND BIS-(TRICHLOROMETHYL)-SULFONE

BACKGROUND OF THE INVENTION

The novel processes or compositions of the present invention are processes or compositions employing from about 5 percent to about 95 percent by weight of bis-(trichloromethyl)-sulfone and from about 95 percent to about 5 percent by weight of bromonitrostyrene. When the ingredients are mixed in the stated amounts, the resulting mixtures possess a high degree of slimicidal activity which could not have been predicted beforehand from the known activity of the individual ingredients comprising the mixture. By means of present invention, it is therefore possible to produce a more effective slime-control agent than has previously been available. It is a particular advantage of the present invention that the compositions may be made more economically than slimicides generally used in industry.

Bis-(trichloromethyl)-sulfone (also called N-1386) is a known compound, and its preparation has previously been described in the literature. See U.S. Pats. Nos. 2,959,517 and 2,628,982.

Bis-(trichloromethyl)-sulfones have demonstrated high efficiencies in the control of micro-organisms present in the aqueous systems utilized in the manufacture of paper products, e.g., paper mill white water, and in cooling e.g., the water used in cooling towers, air washers, and the like. The presence of micro-organisms in such systems generally impairs their efficiency and in the case of paper and pulp products may irreparably contaminate and/or reduce the quality and production rate of the final product.

However, these sulfones cause lachrymation at comparatively low levels. For example, the presence of as little as 10 parts per million of these compounds in the white water of a paper mill may cause extreme discomfort to the operating personnel. While higher concentrations may often be employed in cooling water, the same problems are experienced during unusual wind conditions, or if the cooling tower or air washer is located in proximity to an inhabited structure or area, or an air intake leading to such a structure of area.

The second ingredient of the synergistic composition is bromonitrostyrene which as pointed out in copending application Ser. No. 699,355 filed Jan. 22, 1968 not only exhibits biocidal acitivity but also one which increases with time during its presence in the system being treated. Accordingly the present invention seeks to make use of this feature of the compound together with its biocidal activity further enhanced by the inclusion of the sulfone compound.

Bromonitrostyrene, or more specifically betabromo-betanitrostyrene (the CIS, trans, or mixed forms) possesses the generic formula $C_6H_5 CH = CBrNO_2$ and the structural formula:

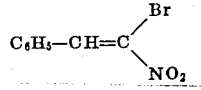

Accordingly, it is an object of the present invention to provide biocidal compositions which are effective at low concentrations against the micro-organisms present in the water and particularly the water employed in paper and pulp mills, cooling systems, and the like. Most desirable, of course, is the provision of biocidal compositions which utilize the biocidal effectiveness of the particular sulfone, while avoiding or reducing the lachrymation problem which otherwise attends the use of these compounds.

The objects of the invention are achieved by combining a bis-(tri-chloromethyl)-sulfone with bromonitrostyrene. By means of such a combination, the total quantity of biocide required for effective treatment may be reduced. In addition, the high degree of biocidal effectiveness which is provided by the sulfone may be exploited without the realization of the extreme lachrymation problem. Furthermore, the combination provides an unexpected synergistic relationship in which the cooperative action of the combined ingredients yields a total effect which is greater than the sum of the effects of the two ingredients taken separately.

To demonstrate the synergism which is provided by the inventive combinations of compounds, as well as the low concentration of bis-(trichloromethyl)-sulfone which are made possible in the highly effective biocidal compositions of the invention, the data set forth in table I has been prepared.

EXAMPLES

The synergism of the compositions of the present invention is shown in table I below. These tests were made in the laboratory with an agar substrate procedure. This procedure in these examples consists of adding the material under test to a nutrient substrate in the amount to give the desired concentration in parts per million. The medium used for the bacteria (*Aerobacter aerogenes*) is trypticase glucose extract agar. The inhibiting concentration is that concentration which does not support the growth of the test organisms. The values expressed in table I are obtained by calculating a value from the inhibiting concentrations. The data show the existence of synergism to a marked degree in all cases. The values reported are the sums of the ratio QA Qa and QB Qb. QA and QB are the quantities of compound A and compound B used in the mixture to produce an end-point, and Qa and Qb are the minimum inhibitory concentrations of compounds A and B, respectively. When the sum of this value is 1, the effect is the same as the toxic effect of each of the components of the mixture and there is no synergism. When the sum of the ratio is greater than 1, the compounds are not compatible (one detracts from the effect of the other) and there is no synergism.

As may be seen by inspection of table I, all of the compositions of the present invention produce a synergistic effect against the test organisms.

TABLE 1

Synergism Summary of Varying Percentages of bis-(trichloromethyl)-sulfone (referred to as "sulfone") and betabromo-betanitrostyrene (referred to as BNS).

TEST ORGANISM

*Aerobacter aerogenes*

| % Sulfone | % BNS | Synergistic Index |
|---|---|---|
| 95 | 5 | 0.86 |
| 50 | 50 | 0.70 |
| 5 | 95 | 0.93 |

It will be evident from the data recorded above that compositions of the present invention function to control slime growth due to micro-organisms not only at equal portions of the respective ingredients but also where just minor amounts of one or the other ingredient is present. This finding of synergism at the lower levels is extremely valuable since it illustrates conclusively that the ingredients are synergistically compatible.

The mode of establishing the synergistic behavior of the compositions of the present invention is a widely used and an industrially acceptable procedure. Although it is believed that the above is sufficient in explaining the procedure, for further explanation thereof reference can be made to U.S. Pat. No. 3,231,509 and its file history where data of this nature was considered to be acceptable. Moreover the article by Kull et al. published in "Applied Microbiology" 9, 1961 pp. 538–541 will furnish additional information in this regard.

For the testing to ascertain synergistic behavior, *Aerobacter aerogenes* was utilized since this micro-organism is found to exist and found to be most troublesome in pulp- and paperproducing processes, as well as in cooling towers. Moreover, this microsorganism is difficult to control and/or kill and accordingly its existence does give rise to troublesome slime. In view of the foregoing, it can then be appreciated that since *Aerobacter aerogenes* is prevalent in most slime-affected systems and since this micro-organism is difficult to control or kill, that once control of this micro-organism is maintained, then for all practical purposes the total micro-organism population with its different types is considered controlled.

When the inventive compositions are employed in the treatment of cooling or paper mill water, they are preferably utilized in the form of relatively dilute dispersions or solutions. For example, a preferred dispersion comprises between 5 percent to 65 percent by weight of the synergistic combination in admixture with various solvents and solubilizing agents. An example of such a synergistic combination comprises 10 percent betabromo-betanitrostyrene, 10 percent by weight of bis-(trichloromethyl)-sulfone, and the remainder composed of such materials as surfactants, aqueous and nonaqueous solvents such as the organic solvents e.g. aliphatic and aromatic hydrocarbons, and/or glycols such as ethylene glycol etc.

Surfactants such as the alkylaryl polyether alcohols, polyether alcohols, sulfonates and sulfates, and the like, may also be employed to enhance the dispersibility and stability of these dispersions. The foregoing biocidal compositions are utilized in order to insure the rapid and uniform dispersibility of the biocides within the industrial water which is treated. It has been found that either aqueous or nonaqueous solvents are generally suitable in the preparation of compositions of the invention, e.g., alcohols, aliphatic hydrocarbons (e.g. kerosene) and aromatic hydrocarbons. Based upon the synergism study as outlined above, it was ascertained that in the treatment of paper mill and cooling water, effective biocidal action is obtained when the concentration or treatment level of the combination or admixture of biocides, is between 0.5 part per million to 1,000 parts per million, and preferably between 1 and 100 parts per million, based upon the total content of the system treated, i.e., total quantity of cooling water or paper mill water. However as would be obvious, the treatment levels would be commensurate with the severity of the problem. Accordingly there is wide latitude in the possible treatment level and sometimes these levels may be above 1,000 p.p.m. The composition may also be utilized for the preservation of slurries and emulsions containing carbohydrates, proteins, fats, oils, etc. Dosage or treatment levels for this utility will range in the vicinity of 0.5 percent. The compositions of the invention which can be prepared by merely combining the respective ingredients and mixing thoroughly at standard conditions, may be fed continuously to the treated system, e.g., by means of a metered pump, or may be fed periodically at intervals calculated to control the growth of slime-forming organisms in the system. Naturally, in the treatment of cooling water the feeding of the inventive compositions must be designed to compensate for blowdown in those systems which employ that expedient.

Although the sulfone compound has been limited in this description to bis-(trichloromethyl)-sulfone, it is obvious that slight modifications of this compound would also operate in the same manner. Likewise betabromo-betanitrostyrene has been described but it is obvious that minor modifications of this compound would also perform the same function. Since the worker in the art would be aware of the possible modifications or substitutions that are possible, it is intended that these modifications be with the scope of the invention.

As would be expected the inventive may be added to the cooling water or the pulp and paper mill systems at any convenient point. Naturally in once-through or noncirculating systems, the composition must be added up-stream from the point or points at which micro-organism control is desired. In circulating systems or pulp and paper systems the composition may be added at any point provided the time lapse and the conditions experienced between point of addition and the point of which the effect of the composition is experienced are not so drastic as to result in the neutralization of the effect of the composition.

In order to establish the effectiveness of the synergistic combination in combating or controlling slime formation which was being experienced in various paper and pulp mills; the combination was tested with water samples derived from actual mills. More specifically, actual water samples were taken from pulp and paper mills which were experiencing slime problems due to the micro-organism population of the water. As is well known slime problems are generally caused by a combination of micro-organisms, which although primarily bacteria and fungus in some cases also includes algae. The samples taken were subjected to respirometer evaluation which in effect established the property of the synergistic combination at specific treatment levels to inhibit the growth of the micro-organisms of the sample.

Respirometer techniques are widely used to evaluate the biocidal activity of various materials. The techniques and the instruments themselves are described in *Manometric Techniques*, Umbreit et al., 4th edition, 1964, Burgess Publishing Company, Minneapolis, Minnesota. Generally the procedure used entails adding a sample of the water which was taken from the operating mill to a manometer flask together with dilutions of the synergistic combination. The samples of water which were used to evaluate the present combinations were taken from the white water of various pulp and paper mills. The manometer flask is equipped with a center well into which is placed a known volume and concentration of potassium hydroxide. The potassium hydroxide possesses the property of absorbing carbon dioxide. The flasks bearing the respective solutions are attached to the manometer and incubated with shaking in a constant temperature bath. The microbial population in the water sample in normal respiration will consume a certain amount of oxygen from the closed gas phase between the surface of the water sample and the manometer fluid. Concurrent with the consumption of oxygen is the evolution of carbon dioxide which is absorbed by the potassium hydroxide contained by the center well. The changes in manometer settings are related to the utilization of oxygen by the micro-organism population in the sample. Inhibition of the respiration of the microbial population by the added synergistic combination is determined by comparing manometer readings with readings obtained from samples treated accordingly which contain no synergistic combination.

The procedure not only indicates the effectiveness or the ineffectiveness as the case might be, of the combination to control the respiration of slime forming micro-organisms at various treatment levels but also indicate the effectiveness of the composition in controlling growth of micro-organisms. In addition the procedure permits correlation of its efficacy or inefficacy with field conditions since actual white water samples from a mill experiencing slime problems are employed. Accordingly the intended purpose of the product, i.e., the control of slime-forming micro-organisms found in commercial systems, is directly evaluated. Moreover since white waters of pulp and/or paper mills generally contain fungi as well as bacteria, the test directly correlates the ability of the composition to control not only bacterial slime but also slime due to fungus.

SPECIFIC EMBODIMENTS

The synergistic blend evaluated was produced simply by thoroughly mixing a composition comprising the listed components in the specified percentage by weight.

EXAMPLE 2

10 percent—bis(trichloromethyl)-sulfone
10 percent—betabromo-betanitrostyrene
5 percent—surfactant (iso octyl phenyl-poly ethoxy-ethanol Triton X-114)
75 percent—Aromatic hydrocarbon solvent (Amsco-F)

TABLE 2

| Composition of | White water sample derived from Mill A, p.p.m. | | | | | |
|---|---|---|---|---|---|---|
| | 1.25 | 2.5 | 5 | 12.5 | 25 | 50 |
| Example 2 | 31 | 53 | 78 | 92 | 96 | 96 |
| Commercial biocide | 34 | 62 | 82 | 92 | 94 | 95 |
| | White water sample derived from Mill B | | | | | |
| Example 2 | 19 | 25 | 46 | 70 | 82 | 91 |
| Commercial biocide | 22 | 31 | 58 | 76 | 86 | 88 |

The respirometer study illustrated that effective control or effective inhibition of the microbial population of the water samples could be obtained by the use of the synergistic combination of the present invention. Percentage inhibitions within the range of 70 percent or better are considered by the industry to be attractive. Accordingly, it is obvious from the data recorded in Table 2 that the composition of the present invention fulfills the prerequisite.

The composition obtained in accordance with Example 1 was evaluated utilizing the above-described respirometer method. The percentage inhibition at the particular treatment levels are recorded in Table 2. The table in addition sets forth the fact that the white water samples tested were derived from different pulp and paper mills. In addition, for comparative purposes, a commercially available biocide which has found extensive use in the paper and pulp industry was tested using the particular white water samples. The commercial biocide contained 20 percent by weight bis-(trichloromethyl)-sulfone and 5 percent methylene bisthiocyanate.

It should be noted that while the preponderance of evidence has been derived from the treatment of paper and pulp mill aqueous systems, the compositions and methods of the present invention are broadly applicable to the treatment of aesthetic waters as well as industrial waters such as cooling waters which are plagued by deposits formed by slime forming organisms, or by the very presence of such organisms.

Having thus described the invention what is claimed is:

1. A composition of matter comprising the combination of between about 5 percent to about 95 percent by weight of betabromo-betanitrostyrene and between about 95 percent to about 5 percent by weight of bis-(trichloromethyl)-sulfone.

2. A composition according to claim 1 in which said sulfone is present in a quantity of 50 percent by weight and said bromonitrostyrene is present in a quantity of 50 percent by weight.

3. A composition as claimed by claim 1 in which between 5 percent to 65 percent by weight of said combination is dispersed in between 35 percent to 95 percent by weight of nonaqueous solvents.

4. A composition as claimed by claim 3 in which said nonaqueous solvents are a mixture of a surfactant, aromatic hydrocarbons and/or glycols.

5. A method for the control of slime in aqueous systems comprising adding to said system an effective amount for the purpose of a composition comprising from about 5 percent to about 95 percent by weight of betabromo-betanitrostyrene and from about 95 percent to about 5 percent by weight of bis-(trichloromethyl)-sulfone.

6. A method according to claim 5 wherein said composition is added to said system a mixture comprising between about 5 percent to about 65 percent by weight of said composition in combination with between 35 percent and 95 percent by weight of a nonaqueous solvent.

7. A method according to claim 6 wherein said aqueous system is the aqueous system of a paper and/or pulp mill.

8. A method according to claim 6 wherein said aqueous system is the water of a cooling water system.

9. A method according to claim 5 in which said composition is added to said system in an amount of between about 0.5 to about 1,000 parts, by weight per million parts by weight of said system.

10. A method as claimed by claim 9 in which said sulfone is present in a quantity of 50 percent by weight and said bromonitrostyrene is present in a quantity of 50 percent by weight.

11. A method as claimed by claim 10 in which said composition is added to said system as a combination comprising between about 5 percent to about 65 percent by weight of said composition in combination with between 35 percent to about 95 percent by weight of a nonaqueous solvent.

12. A method as claimed by claim 11 in which said nonaqueous solvent is a mixture of a surfactant and an aromatic hydrocarbon.

* * * * *